United States Patent [19]
Kühne

[11] Patent Number: 5,103,688
[45] Date of Patent: Apr. 14, 1992

[54] TWO-MASS FLYWHEEL

[75] Inventor: Viktor Kühne, Bopfingen, Fed. Rep. of Germany

[73] Assignee: J. M. Voith MmbH, Heidenheim, Fed. Rep. of Germany

[21] Appl. No.: 582,529

[22] Filed: Sep. 14, 1990

[30] Foreign Application Priority Data

Sep. 14, 1989 [DE] Fed. Rep. of Germany ....... 3930715

[51] Int. Cl.$^5$ ................... F16F 15/10; F16D 13/68; F16D 3/14
[52] U.S. Cl. .................. 74/574; 192/70.17; 192/106.1
[58] Field of Search ............ 74/574; 192/70.17, 106.1, 192/106.2

[56] References Cited

U.S. PATENT DOCUMENTS

| | | | |
|---|---|---|---|
| 4,662,239 | 5/1987 | Worner et al. | 192/106.2 X |
| 4,782,718 | 11/1988 | Hartig et al. | 192/106.2 X |
| 4,782,936 | 11/1988 | Bopp | 192/106.2 |
| 4,788,884 | 12/1988 | Reik et al. | 74/574 |
| 4,813,524 | 3/1989 | Reik | 192/106.2 |
| 4,906,220 | 3/1990 | Worner et al. | 192/106.2 X |
| 4,961,487 | 10/1990 | Langeneckert | 192/106.2 |

Primary Examiner—Allan D. Herrmann
Assistant Examiner—David W. Laub
Attorney, Agent, or Firm—Baker & Daniels

[57] ABSTRACT

A two-mass flywheel for installation between an internal combustion engine and gearing is able to cope with peak torques, especially in the region of the resonance rotation rate, with a friction device unlimitedly twistable in the circumferential direction, which is connected in series with a spring unit. With the friction device a displacement chamber and stop are combined so that slipping of the friction device occurs only on hydraulically damped abutting of the two masses, the arrangement being made such that only small masses have to be accelerated for the case of slipping.

17 Claims, 3 Drawing Sheets

TWO-MASS FLYWHEEL

BACKGROUND OF THE INVENTION

The invention relates to a two-mass flywheel for installation between an internal combustion engine and gearing, especially in a motor vehicle.

A two-mass flywheel is known from DE-OS 3,905,032.7, which is not a previous publication. It comprises an elastic coupling which is arranged between a first and a second mass and is connected in series with a friction clutch capable of slip. In this case a friction element of the friction clutch is subject to centrifugal action and is thus in a position to limit the transmitting torque, below a defined rotation rate. Thus peak torques in the resonance range are diminished.

It is disadvantageous in this construction that the friction elements are of high mass and furthermore are arranged on the secondary side on the mass facing the gearing, which involved a reduction of the mass inertia moment facing the engine. This reduction of the mass inertia moment on the primary side can lead to a critical increase in the irregularity in the rotation of the engine. Furthermore, the enclosure of the springs for the slip segments necessary for lubrication is very expensive.

SUMMARY OF THE INVENTION

The invention is based on the problem of so forming a two-mass flywheel that while dangerous peak moments are absorbed by slippage nevertheless a reduction of the mass inertia moment on the primary side is avoided. Furthermore, the two-mass flywheel should comprise a simple and yet reliable sealed enclosure of the interior space.

According to the invention there is provided a two-mass flywheel for installation between an internal combustion engine and gearing with the flywheel having a first mass allocated to the crankshaft of the engine and a second mass allocated to the gearing, a spring unit for transmitting the torque and a friction device capable of slip and connected in series with the spring unit, the friction device having spring-loaded friction segments between two discs arranged to form a fluid-tight inner chamber fillable with a damping medium; wherein a) the friction device is freely rotatable within the discs in the circumferential direction, after the friction force is overcome;

b) the introduction of circumferential force from the first mass into the spring unit takes place directly or indirectly by way of the friction device, while the spring unit comprises at least one spiral spring arranged in the circumferential direction, which is inserted into an aperture on a central disc connected with the second mass;

c) the spring force between the friction segments is so dimensioned that on the occurrence of torque peaks in critical rotation rates, a slipping of the friction device is possible, while the maximum working torque is transmitted without slip;

d) the friction device is part of a displacement chamber for the damping of stop means on the occurrence of torque peaks after the overcoming of the free spring stroke or twisting angle between two opposite end positions.

In accordance with the invention a friction device is provided which is clamped in between the discs of the first mass of the two-mass flywheel with axial pressure, but so as to be capable of slip in the circumferential direction. Into the friction device a spring support is integrated for a series-connected spring arrangement which transmits the torque to a second mass connected with a central disc. The force path extends from the crankshaft to the first mass with the discs, thence by way of frictional engagement to the friction device, further by way of a spring arrangement to the central disc and hence to the second mass. The friction device is preferably composed of frictional segments pressed axially through built-in springs against the discs. For this purpose, the spring force is so dimensioned that the maximum working torque is transmitted without slip while an unlimited free rotation is possible when the frictional engagement is interrupted on occurrence of torque peaks, for example in driving through critical rotation rates. Into the two-mass flywheel there is further integrated a displacement chamber by means of which the two masses, after overcoming the maximum spring stroke in the spring arrangement, strike in damped manner upon one another before any slipping of the friction device. Furthermore, torsional vibrations in the entire working range of the engine are also damped in the displacement chamber.

The advantages of this arrangement consist in that several functions are accommodated in minimum construction space within the two-mass flywheel. The friction device is a component of the primary side during the slip-free working, that is it is allocated to the first mass. In the case of occurrence of peak torques, the break-away moment for the friction device is composed of the circumferential force acting upon the spring of the or each spring unit and a residual force, exceeding this spring stress, up to a hydraulically damped mechanical stop means. The parts of the friction device which are to be accelerated in break-away constitute a small mass, so that slipping and stopping of the rotating movement under limited torque is free from jolts. This results in a higher stability of the sliding parts with simultaneous suppression of danger resonance phenomena.

The spring units can be arranged radially within the friction device, so that large-volume displacement chambers can be arranged on the external circumference of the interior space between the friction segments of the friction device. Alternatively, the spring units can be arranged radially outward, while spring plates of the springs thereof rest directly on a carrier of the friction device. Either radially outwardly directed dogs or the spring plates of the spring unit form a mechanical stop for the limitation of the angle of rotation. Radially externally situated displacement chambers can be formed between the dogs of the central disc and the carrier of the friction device. Tongues can be provided on the carrier, which tightly enclose the dogs and engage directly on the spring plates of the spring unit. The friction segments can be either tangentially guided and axially floatingly arranged in a guide pocket of the carrier or inserted in shape-engaging manner in a guide pocket with guided extension springs.

The carrier itself can be made in two parts and formed as the friction segments in which case the expansion springs are arranged between the two halves of the carrier. The friction device is desirably fitted in order to keep the tolerances for the maximum transmittable torque as small as possible.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. The exemplification set out herein illustrates one preferred embodiment of the invention, in one form, and such exemplifications are not to be construed as limiting the scope of the invention in any manner.

DESCRIPTION OF THE PREFERRED EMBODIMENT

Figure 1:
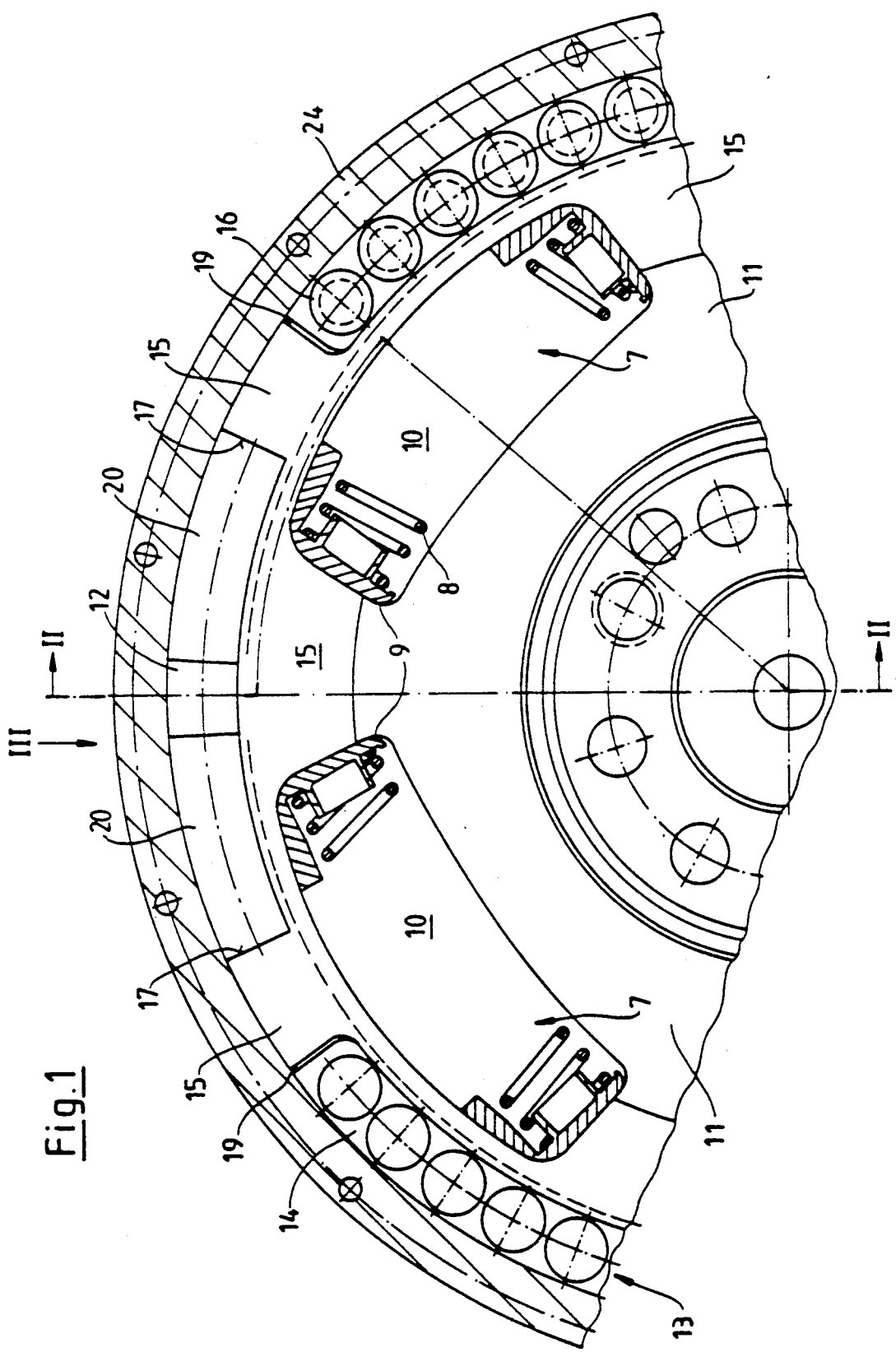
FIG. 1 is a cross-section through part of a two-mass flywheel with internal spring units.
Figure 2:
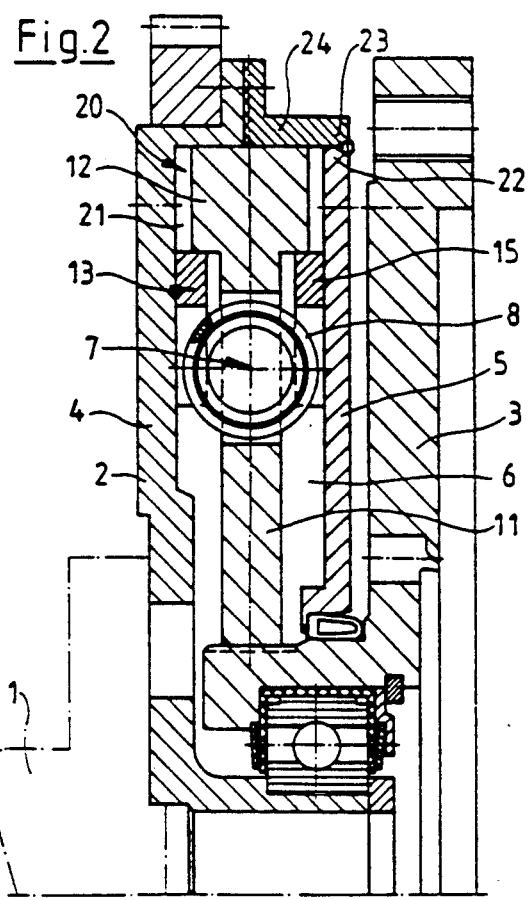
FIG. 2 is a longitudinal section along the line II—II in FIG. 1.
Figure 3:
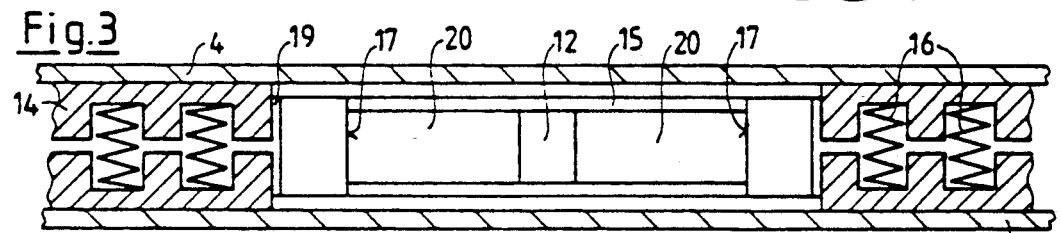
FIG. 3 is sectional plan view taken in the direction of the arrow III in FIG. 1.

The two-mass flywheel represented in FIGS. 1-3 comprises a first mass 2 driven by a crankshaft 1 of the drive motor and a second mass 3 connected with gearing (not shown). The first mass comprises two radial discs 4 and 5 spaced apart axially to form a fluid-tight internal chamber 6 which is fillable with damping medium. Between discs 4, 5 there is situated a friction device 13 having a plurality of pairs of friction segments 14 inserted in a carrier 15. As depicted friction device 13 has three pairs of friction segments 14. As appears especially from FIGS. 1 and 3, friction segments 14 are guided in the circumferential direction in guide pockets 19. In the axial direction friction segments 14 are merely under the axial force of springs 16. Segments 14 are pressed by means of axially acting expansion springs 16 from the interior against side discs 4, 5. Radially within friction device 13 there are situated several spring units 7 which constitute the connection to central disc 11 allocated to second 3. A sealing of interior chamber 6 against escape of damping medium can be provided between the radially inner part of disc 5, against second mass 3. Each spring unit 7 comprises a spring 8 which is clamped by means of spring plates 9 arranged at the ends in apertures 10 within disc 11. Each spring unit 7 is supported through spring plates 9 at the same time on friction device 13, by means of a similar formation of carrier 15 in the region of apertures 10 of disc 11. Force can be transmitted from first mass 2, that is to say discs 4, 5, by way of frictional engagement on friction segments 14 to carrier part 15 of friction device 13, and thence further by way of springs 8 of spring units 7 to disc 11 associated with second mass 3.

Central disc 11 comprises several dogs 1 protruding into the radially outer region of internal chamber 6. On the circumference, between friction segments 14, carrier part 15 is provided with recesses into which dogs 12 extend from the interior. Thus on both sides of each dog 12 displacement chambers 20 are formed which are limited radially outwardly and axially by discs 4, 5 and are limited radially inward or in the circumferential direction by faces of dog 12 or stop faces 17 on carrier part 15 forming stop means. Carrier part 15 is radially pierced in the region of displacement chamber 20, so that each dog 12 can move in the circumferential direction. Dogs 12 have two functions. First, they perform a displacement function for the damping medium in chamber 6 because axial gaps 21 are formed between dogs 12 and discs 4, 5. Second, dogs 12 act as stops by abutment on faces 17, as soon as an over-large angle of relative twisting motion occurs under critical operational conditions and as a result of peak torques. The striking of dogs 12 on stop faces 17 accordingly occurs in damped manner after total displacement of the damping medium out of displacement chambers 20. Spring plates 9 which abut with springs 8 can also serve as a stop or rotation angle limitation.

Figure 5:
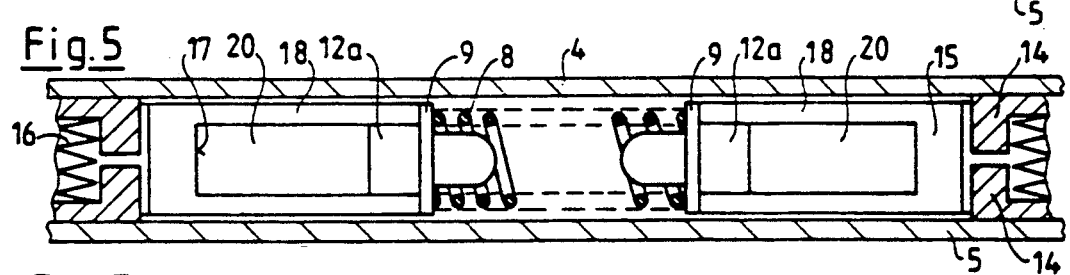
FIG. 5 is a sectional plan view taken in the direction of the arrow V in FIG. 4.
Figure 4:
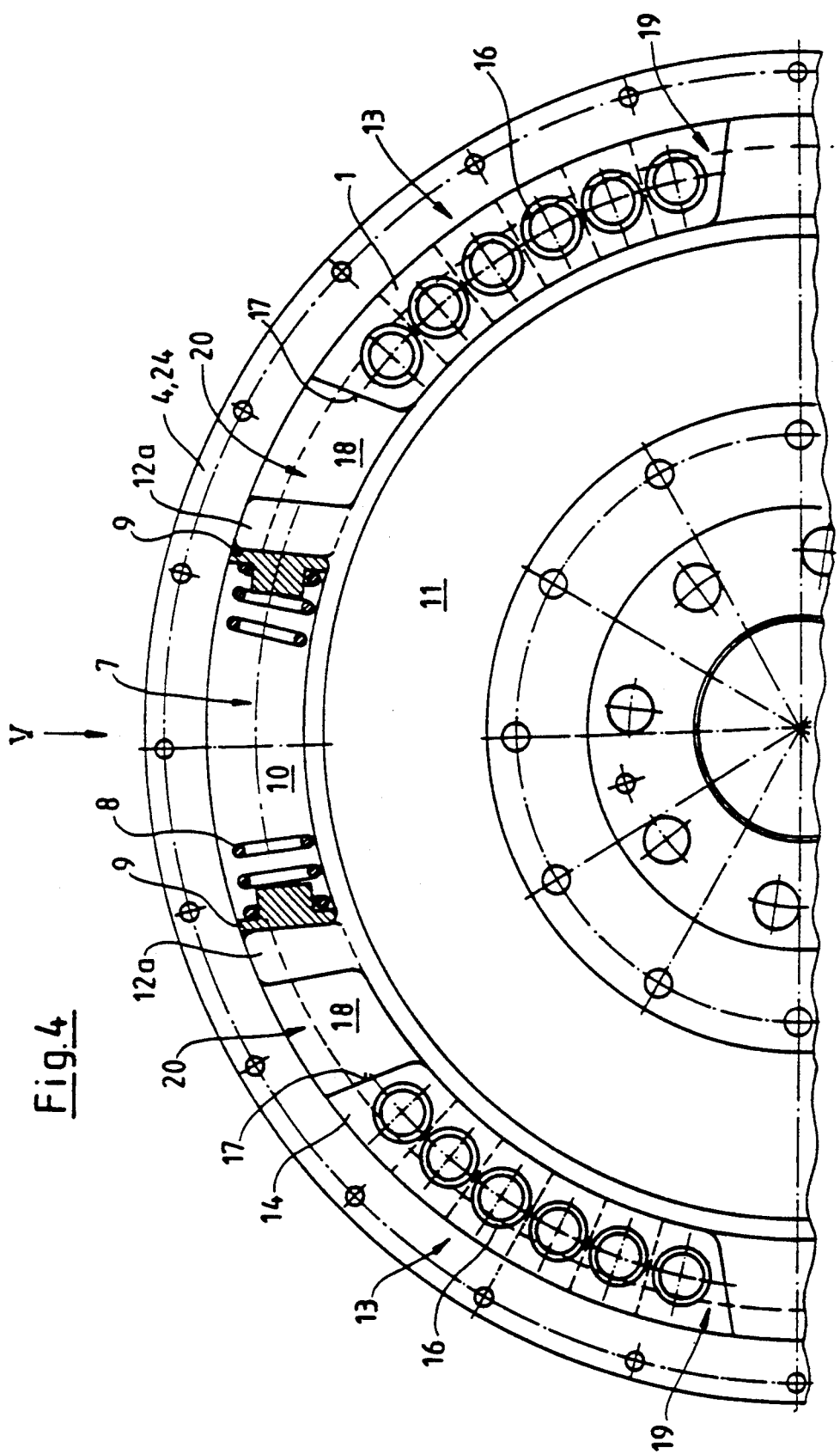
FIG. 4 is a cross-section through part of a two-mass flywheel with external spring units.

FIGS. 4 and 5 show a two-mass flywheel in which spring units 7 are arranged in the radially outer region of inner chamber 6. Springs 8 are supported in the circumferential direction through spring plates 9 on dogs 12a on central disc 11. On both sides of dogs 12a, carrier 15 has tongues 18, which also engage with the same spring plates 9. If a twisting of spring units 7 in relation to disc 11 takes place, then in each case one of the dogs 12a lifts itself away from spring plate 9 and dips into the region between two tongues 18 of the nearest spring unit 7. This region between tongues 18 is again formed as part of the displacement chambers 20, while dogs 12a represent stops in relation too stop faces 17 between tongues 18 on carrier 15. A corresponding part of displacement chambers 20 is also arranged on the other side of spring 8.

The last-described formation of carrier 15 with tongues 18 which represent the lateral limitation of displacement chambers 20 has an advantage over the embodiment according to FIGS. 1-3 in that gaps 21 in the region of dogs 12a are smaller and accordingly a more intense damping takes place. Furthermore, however, dogs 12 can also be made wider in the axial direction in the region of displacement chambers 20, in the embodiment according to FIGS. 1-3, so that there to displacement chambers with improved effectiveness are present. Moreover, the gap width an be varied in known manner by means of the angle of twist, in order to improve the damping before the reaching of the stop.

Carrier 15 as described can be a one-piece component in the forms of embodiment as described hitherto. Friction segments 14 are inserted into guide pockets 19 in axially floating manner and guided in the circumferential direction.

Figure 6:
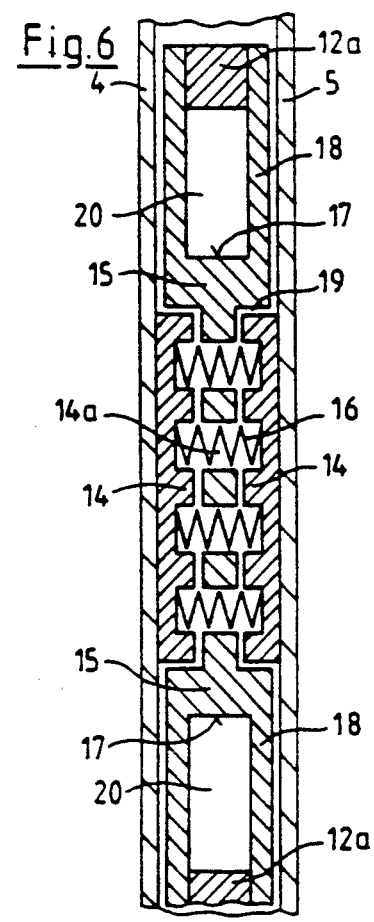
FIG. 6 is a sectional view of part of a carrier with guided friction segments.

FIG. 6 shows a further embodiment in which friction segments 14 are likewise inserted into guide pockets 19 in carrier 15, springs 16 being guided by means of corresponding openings 14a in the inner region of carrier 15. In this embodiment, several functions are combined in carrier 15 of friction device 13: guidance of the friction segments 14 in the circumferential direction; transmission of circumferential force to spring plates 9; formation of displacement chambers 20; end stops for dogs 12a by way of faces 17, and guides for expansion springs 16 in the region of guide pockets 19 for friction segments 14. This formation is advantageous when the carrier, for weight reasons, consists of a preferably wear-resistant synthetic plastics material and friction segments 14 consist of a metal which is favorable as regards the friction properties.

Figure 7:
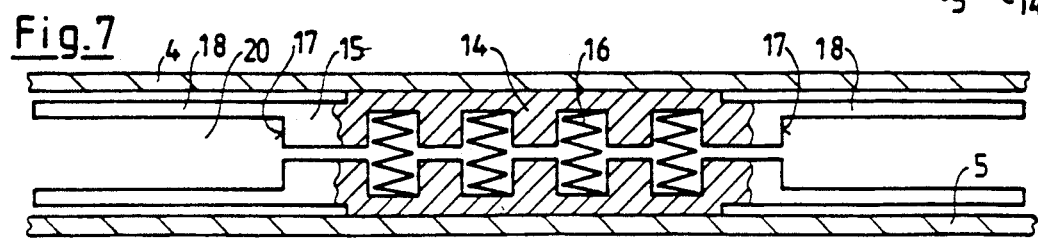
FIG. 7 is a sectional view of part of a carrier formed as friction segments.

In FIG. 7, there is represented a two-part formation of carrier 15 where expansion springs 16 are arranged between the two halves of carrier 15. Thus the carrier itself is formed as friction segments of friction device 13.

In order to ensure that all expansion springs 16 exert upon friction segments 14, the pressure application force which is necessary for the slip-free transmission of the maximum torque, one side disc 5 is secured in a special manner. According to the illustration in FIG. 2, side disc 5 possesses a centering 22 by means of which it is secured by way of a counter-face 23 on an externally situated housing component 24, for example by welding. For this purpose side disc 5 in fitting is loaded with the axial force fixed for the transmission of the torque, and thereupon secured to housing component 24. Due to this force-controlled fitting production, tolerances of springs 16 have far less effect upon the range of scatter for the torque which friction device 13 has to transmit.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A two-mass flywheel adapted for installation between an internal combustion engine and gearing, comprising:
    a first mass adapted to be connected to the crankshaft of the engine including two side discs arranged to form a fluid tight inner chamber fillable with a damping medium,
    a second mass adapted too be connected to the gearing,
    a spring unit means connected between the first and second masses for transmitting torque therebetween,
    a friction device located within the discs of said first mass and including a plurality of spring-loaded friction segments between said side discs, said friction device being freely rotatable between said discs in the circumferential direction after friction force is overcome, the spring force between said plurality of friction segments being such that upon occurrence of torque peaks in critical rotation rates a slippage of said friction device is possible,
    said friction device being connected inn series with said spring unit means so that the introduction of circumferential force from the first mass into the spring unit means takes place by way of said friction device,
    a central disc fixedly connected with said second mass and including at least one aperture,
    said spring unit means including at least one spiral spring arranged in the circumferential direction and located in said aperture,
    said friction device being part of a displacement chamber for damping stop means disposed between said first and second masses on the occurrence of torque peaks after the overcoming of free spring twisting angle between two opposite end positions of said stop means.

2. The two-mass flywheel according to claim 1, wherein said side discs define an internal space therebetween, said friction device being located in a radially outer region of said internal space.

3. The two-mass flywheel according to claim I, including a plurality of said spring unit means, said spiral springs of said plurality of spring unit means being located radially within said friction device.

4. The two-mass flywheel according to claim 3, wherein said side discs define an internal space therebetween, said friction device being located in a radially outer region of said internal space.

5. The two-mass flywheel according to claim 1, wherein said stop means comprises a plurality of radially outwardly directed dogs on said central disc, said friction device located between said dogs.

6. The two-mass flywheel according to claim 4, wherein said central disc comprises a plurality of radially outwardly directed dogs, said friction device located between said dogs.

7. The two-mass flywheel according to claim 6, wherein said stop means includes a plurality of stop faces on said friction device, said dogs on said central disc engaging said stop faces in the case of peak torques after the maximum spring stroke is overcome.

8. The two-mass flywheel according to claim 5, wherein said friction device includes a carrier and said side discs define an internal space therebetween, said spring unit located in a radially outer region of the internal space relative to the friction device while said spring unit means is supported in the circumferential direction by a plurality of spring plates located on said carrier and between two of said dogs, forming an aperture on said central disc.

9. The two-mass flywheel according to claim 1, wherein at least one of said spiral springs of said spring unit means includes a spring plate means which limits the twisting angle on the occurrence of peak torques.

10. The two-mass flywheel according to claim 5, wherein said side discs define an internal space therebetween and the radially outer region of the internal space includes said displacement chambers for an enclosed damping medium, said chambers being limited in the axial direction and radially outward by the contour of the internal space and in the circumferential direction by one of said friction device and said dogs movable therein.

11. The two-mass flywheel according to claim 10, wherein said friction device includes a carrier comprising a plurality of tongues extending in the circumferential direction and enclosing said dogs of said central disc on both sides to form the axial limitation of said displacement chambers.

12. The two-mass flywheel according to claim 11, wherein at least one of said spiral turns of said spring unit means includes a spring plate means which limits the twisting angle on the occurrence of peak torques, wherein said tongues are formed as support faces for said spring plates.

13. The two-mass flywheel according to claim 8, wherein a plurality of said friction devices are arranged in a circumferential direction, said carrier having openings into which pairs of friction segments are inserted, said friction segments being axially floating and guided in the circumferential direction by expansion springs.

14. The two-mass flywheel according to claim 13, wherein said carrier comprises guide pockets for radial and tangential guidance of said friction segments and openings for the reception of said expansion springs.

15. The two-mass flywheel according to the claim 1, wherein said friction device includes a carrier having at least two parts forming said friction segments therebetween, said two parts being biased against said side discs by expansion springs.

16. The two-mass flywheel according to claim 1, including a housing component equipped with a counter-face, wherein at least one of said side discs includes a circular radial centering, said side disc being located axially in said housing component and said radial centering secured to said counter-face in sealing manner, after application of a predetermined assembly travel corresponding to the axial pressure application force of said friction segments on said side discs.

17. A two-mass flywheel adapted to be connected between an internal combustion engine and gearing, comprising:

a first mass connected to the crankshaft of the engine and including two side discs arranged to form a fluid tight inner chamber fillable with a damping medium, a second mass connected to the gearing, a spring unit means connected between the first and second masses for transmitting torque therebetween, a friction device located within the discs of said first mass and including a plurality of spring-loaded friction segments between said side discs, said friction device being freely rotatable between said discs in the circumferential direction after friction force is overcome, the spring force between said plurality of friction segments being such that upon occurrence of torque peaks in critical rotation rates a slippage of said friction device is possible, said friction device being connected in series with said spring unit means so that the introduction of circumferential force from the first mass into the spring unit means takes place by way of said friction device, a central disc connected with said second mass and including at least one aperture, said spring unit means including at least one spiral spring arranged in the circumferential direction and located in said aperture, said friction device being part of a displacement chamber for damping stop means disposed between said first and second masses on the occurrence of torque peaks after the overcoming of free spring twisting angle between two opposite end positions of said stop means.

* * * * *

UNITED STATES PATENT AND TRADEMARK OFFICE
CERTIFICATE OF CORRECTION

PATENT NO. : 5,103,688
DATED     : April 14, 1992
INVENTOR(S) : Viktor Kunne

It is certified that error appears in the above-identified patent and that said Letters Patent is hereby corrected as shown below:

Claim 1, Column 5, Line 41, delete "too" and substitute therefor --to--;

Claim 1, Column 5, Line 55, delete "inn" and substitute therefor --in--.

Claim 3, Column 6, Line 7, delete "I" and substitute therefor --1--.

Signed and Sealed this

Seventh Day of September, 1993

Attest:

BRUCE LEHMAN

*Attesting Officer*   *Commissioner of Patents and Trademarks*